(12) United States Patent
Northfield

(10) Patent No.: US 8,979,500 B2
(45) Date of Patent: Mar. 17, 2015

(54) METHOD OF MANUFACTURE OF AEROFOIL LEADING EDGE STRIP

(75) Inventor: Quinten J. Northfield, Bromley (GB)

(73) Assignee: Rolls-Royce PLC, London (GB)

( * ) Notice: Subject to any disclaimer, the term of this patent is extended or adjusted under 35 U.S.C. 154(b) by 513 days.

(21) Appl. No.: 12/822,465

(22) Filed: Jun. 24, 2010

(65) Prior Publication Data

US 2011/0027096 A1    Feb. 3, 2011

(30) Foreign Application Priority Data

Jul. 31, 2009  (GB) .................................. 0913290.3

(51) Int. Cl.
| | | |
|---|---|---|
| B29C 43/32 | (2006.01) | |
| F01D 5/14 | (2006.01) | |
| B29C 70/22 | (2006.01) | |
| B29C 51/00 | (2006.01) | |
| B29C 51/08 | (2006.01) | |
| B29K 105/08 | (2006.01) | |
| B29K 271/00 | (2006.01) | |
| B29L 31/08 | (2006.01) | |
| B29L 31/30 | (2006.01) | |

(52) U.S. Cl.
CPC ............. *B29C 70/222* (2013.01); *B29C 51/004* (2013.01); *B29C 51/082* (2013.01); *B29K 2105/0809* (2013.01); *B29K 2105/0845* (2013.01); *B29K 2271/00* (2013.01); *B29L 2031/08* (2013.01); *B29L 2031/3085* (2013.01)
USPC ........................................ 416/241 A; 364/325

(58) Field of Classification Search
USPC ...... 29/527.1, 889.7; 416/224, 229 R, 241 A, 416/241 B, 241 R, 247 R; 264/320, 322, 324, 264/325
See application file for complete search history.

(56) References Cited

U.S. PATENT DOCUMENTS

| | | | |
|---|---|---|---|
| 5,462,408 A | * | 10/1995 | Coffy ......................... 416/134 A |
| 5,961,288 A | | 10/1999 | Legendre et al. |
| 2002/0012591 A1 | * | 1/2002 | Montague et al. ......... 416/241 R |
| 2005/0053466 A1 | * | 3/2005 | Finn et al. ..................... 416/230 |
| 2006/0081329 A1 | | 4/2006 | Kikuchi |
| 2008/0113179 A1 | | 5/2008 | Schreiber |
| 2008/0159870 A1 | * | 7/2008 | Hong ............................ 416/224 |
| 2008/0265464 A1 | * | 10/2008 | D'Hooghe et al. ........... 264/322 |

FOREIGN PATENT DOCUMENTS

| | | |
|---|---|---|
| EP | 0 375 280 A1 | 6/1990 |
| EP | 1 462 606 A1 | 9/2004 |
| EP | 2 111 969 A2 | 10/2009 |

(Continued)

OTHER PUBLICATIONS

Search Report issued in British Patent Application No. 0913290.3, on Nov. 23, 2009.

(Continued)

*Primary Examiner* — Nathaniel Wiehe
*Assistant Examiner* — Woody A Lee, Jr.
(74) *Attorney, Agent, or Firm* — Oliff PLC

(57) ABSTRACT

A protective leading edge strip component for an aerofoil is formed from a sheet of PEEK fabric woven in two-dimensions by draping the sheet over a male moulding tool (12) the shape of which represents the shape of a leading edge of the aerofoil, and applying a female moulding tool (14) so as to trap a portion of the PEEK fabric between the two moulding tools and applying heat and pressure.

14 Claims, 3 Drawing Sheets

(56) References Cited

FOREIGN PATENT DOCUMENTS

GB 2 225 742 A 6/1990
WO WO 2006/047366 A1 5/2006

OTHER PUBLICATIONS

European Search Report dated Nov. 16, 2010 in corresponding European Application No. 10 167 139.4.

* cited by examiner

METHOD OF MANUFACTURE OF AEROFOIL LEADING EDGE STRIP

BACKGROUND

The present invention relates to a method of manufacturing a protective leading edge strip for an aerofoil, such as a vane or blade. The invention is concerned particularly with a thermoplastic protective leading edge strip for a composite aerofoil vane.

Within aero engines the leading edges of rotating and stationary aerofoils are often subjected to high-levels of erosion and impact loading. In particular fan blades and guide vanes endure harsh abrading environments including dust, sand, ice and water as well as occasional impacts from foreign bodies such as birds and other debris. Therefore the leading edges are often reinforced to make them more resilient to these environments.

Conventionally, with metallic aerofoils the choice of metal may be sufficient to ensure the appropriate resistance to the harsh environment, or else a surface coating may be added to increase the resistance. However when considering composite technologies for fan blades and guide vanes, the composite material alone is not sufficient to withstand common levels of erosion or of impacts. Accordingly, if no extra protection is afforded to the composite blade at its leading edge, damage can propagate into the more structural parts of the aerofoil. Because of this, solutions have been proposed which include wrapping pieces of metal around the leading edges. This gives some protection of erosion and also give the possibility to dress back the leading edge. It also provides protection against impact from foreign bodies. Such an approach has been widely adopted in the field of aero engines.

However, when using a metallic sheath on the leading edge of a composite aerofoil there is a need to apply separate surface treatments to both the sheath and the aerofoil and then bond the two together, which requires an extra production step. Furthermore, as the metallic sheaths are not generally structural components of the aerofoil they add weight without adding structural performance.

An additional problem arises in that air worthiness regulations specify that any separate, or separable, component must be contained within the engine and must not endanger the aircraft or any ground equipment. Therefore it is necessary to take steps to contain any metallic leading edge which has the possibility to detach during high-energy impact events and become released. This is an especially important issue when used on rotating components such as fan blades. If a metallic leading edge is released from a fan blade it can become effectively a high-energy spear which, if not contained, can pose a serious threat to the aircraft. Containing metallic components of this kind can necessitate an increase in both the cost and the weight of the structures required to contain them.

Currently some composite vanes have polyaryl ether ether ketone or polyetheretherketone (PEEK) thermoplastic erosion systems. The method of manufacture is to use both heat and pressure to form a PEEK sheet onto some glass fabric over a moulding tool to make a PEEK leading edge strip. The mould tool itself represents the first 30 mm or so of the aerofoil, and thus defines the leading edge strip component itself.

Once this leading edge strip has been formed it is placed in the resin transfer mould (RTM) tool cavity along with the remaining materials that go to make up the composite vane, the other materials comprising mainly carbon fibre 3D woven preforms and 2D carbon fibre fabrics.

Once layup is complete the mould cavity is injected and filled with resin which is then cured.

During this process the resin that fills the mould micro-fills the glass fabric on the PEEK leading edge strip component. This interaction between the glass fabric and the resin provides a bond interface between the PEEK material and the vane itself.

The manufacture of the PEEK leading edge strip is done in a compression mould tool. The glass fabric and PEEK sheet are laid over the tool and pressure is then applied to pre-clamp the tool and materials. The tool is then placed in an oven to ensure that the temperature is controlled to within very tight limits all over the surface of the tool. Once the PEEK has reached the melt temperature it partly flows into the glass fabric.

Temperature and pressure variance across the tool surface directly affects the amount of PEEK that flows into the glass fabric and therefore can result in a variation in the strength of the bond between the two materials. The difference in the co-efficient of thermal expansion (CTE) of the materials also results in "spring-back" therefore affecting the form of the part, as well as causing inherent stress between the two materials which leads to potentially weak areas in the bond interface.

An alternative previously considered method is to use just a PEEK fabric by itself. However when this is used the woven architecture of the fabric opens up as it goes around the edge, and this causes a rough surface which is not deemed aerodynamically acceptable. Furthermore because the fibres have opened up around the edge the material becomes structurally weakened in this crucial area.

SUMMARY

Embodiments of the present invention aim to provide a protective leading edge strip for a composite aerofoil in which at least some of the above-mentioned problems are addressed.

The present invention is defined in the attached independent claims, to which reference should now be made. Further, preferred features may be found in the sub-claims appended thereto.

According to the invention there is provided a method of forming a protective leading edge strip component for an aerofoil, the method comprising locating a portion of a thermoplastics fabric sheet between complementary male and female moulding tools and applying heat and pressure to the portion of fabric to cause the portion of fabric to take the shape of at least the tip of the male moulding tool.

At least the tip of the male moulding tool may have the shape of a leading edge of an aerofoil.

The female moulding tool preferably has a recess which is arranged in use to retain only the tip of the male moulding tool.

Preferably heat is applied to the portion of fabric by the female moulding tool.

The fabric may comprise a polyaryl ether ether ketone woven fabric.

The invention also includes a protective leading edge strip component for use in manufacturing an aerofoil, the component comprising a thermoplastics fabric sheet formed according to a method described herein.

The invention also includes an aerofoil comprising a protective leading edge strip component formed according to the present invention.

The invention also includes an engine including an aerofoil having a protective leading edge strip formed according to any statement herein.

A preferred embodiment of the present invention will now be described by way of example only, with reference to the accompanying diagrammatic drawings, in which:

DETAILED DESCRIPTION OF THE EMBODIMENTS

An embodiment of the invention will now be described in greater detail with reference to the drawings.

Figure 1:
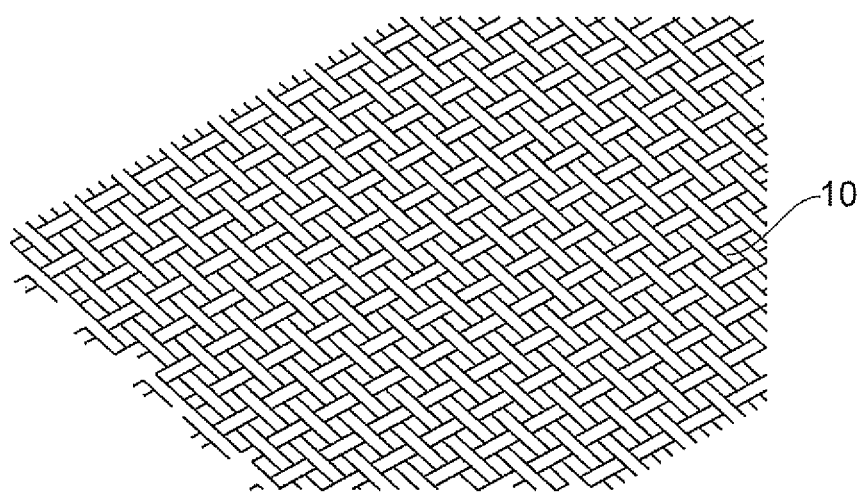
FIG. 1 shows a portion of polyaryl ether ether ketone (PEEK) fabric.
Figure 2:
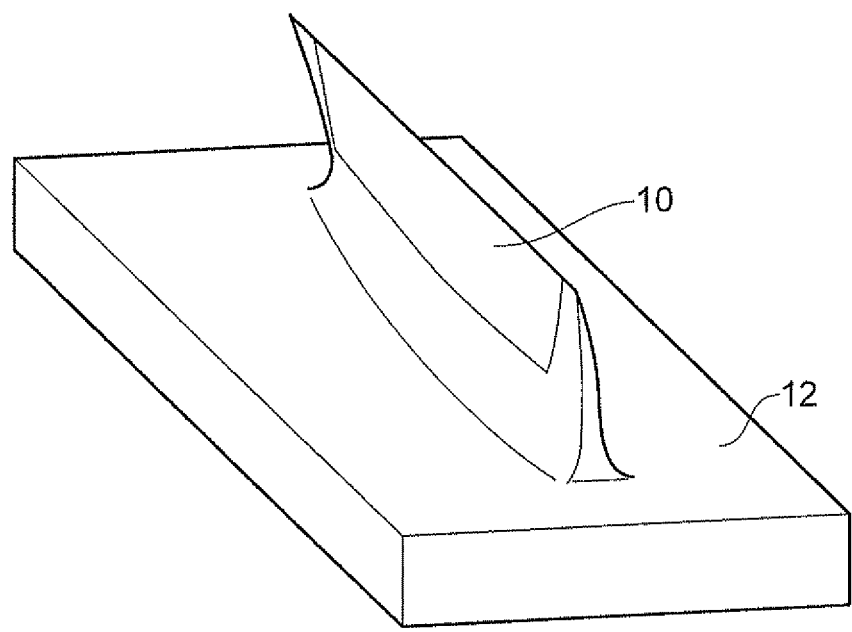
FIG. 2 shows a male moulding tool for use in forming a protective leading edge strip in accordance with an embodiment of the present invention.

Firstly, as shown in FIG. 1, a sheet 10 of PEEK fabric, woven in two dimensions, is taken. Turning to FIG. 2, the sheet 10 is draped over a male moulding tool 12, the shape of which represents the shape of the leading edge of an aerofoil for which a leading edge strip component is to be made, in accordance with the invention.

Figure 3:
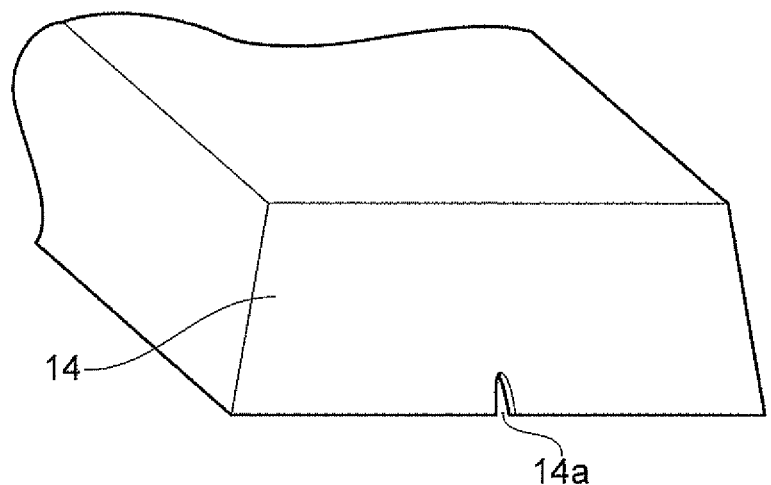
FIG. 3 shows a female moulding tool for use forming a protective leading edge strip in conjunction with the male tool of FIG. 2, in accordance with an embodiment of the present invention.

FIG. 3 shows part of a female moulding tool 14 generally of trapezoidal prism shape, which includes a shallow elongate recess 14a shaped to complement the tip of the male tool 12. The depth of the recess 14a is arranged so as to be able to accommodate only the very edge of the aerofoil profile of the male tool 12, which is in this case approximately the first 3 mm of the male tool 12.

Figure 4:
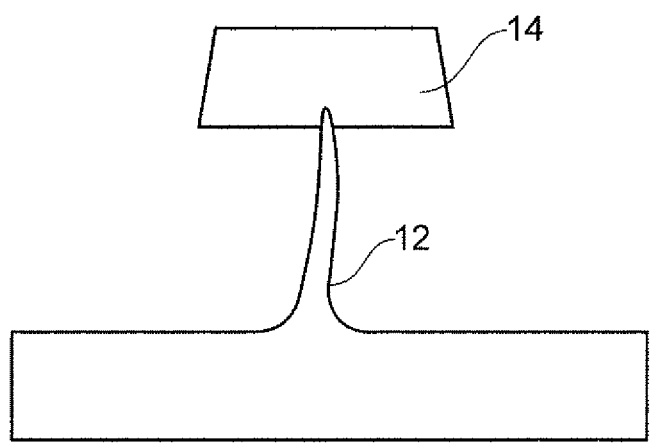
FIG. 4 shows schematically the male and female moulding tools, respectively of FIGS. 2 and 3, together in an operational configuration.
Figure 5:
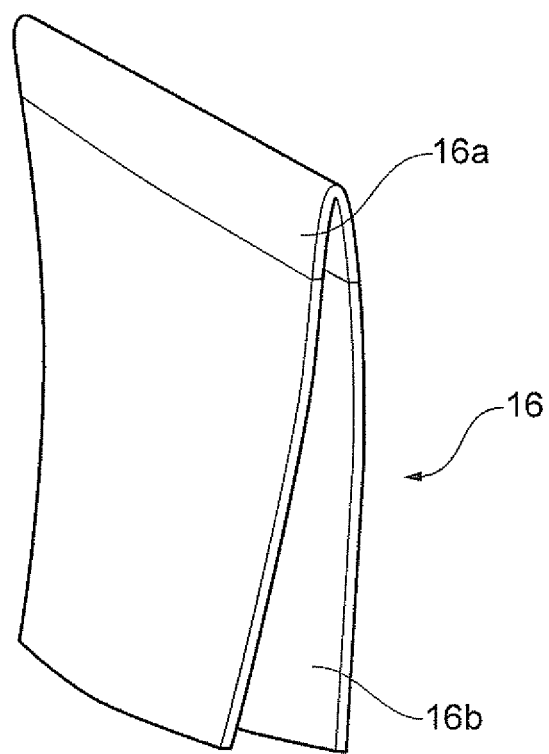
FIG. 5 shows a leading edge component formed by the moulding tool of FIGS. 2 to 4.

The assembled male 12 and female 14 moulding tools are shown in FIG. 4. Heat is applied to the female tool 14 by an electric current via electrodes (not shown) and the female tool 14 is pressed against the male tool 12. The applied heat and pressure has the effect of melting and smoothing the portion of the PEEK sheet 10 that is gripped between the moulding tools 12 and 14, which provides a smooth leading edge profile of some 3 mm depth.

After removing the PEEK sheet 10 from the moulding tools a leading edge strip component 16 remains, in which a portion 16a is smoothly solidified PEEK material, shaped to form a leading edge profile for an aerofoil, and a portion 16b remains as unmoulded drapable PEEK fabric.

The leading edge strip component 16 formed in accordance with the above process does not suffer from the problems associated with prior leading edge strip components made from PEEK fabric. In particular, due to the heat and pressure applied only to the extremity of the profile by the female moulding tool, there is a smooth aerodynamically suitable surface at this point. Furthermore, since the individual fibres are not exposed or disturbed the component retains its structural strength.

Due at least in part to the ready drapability of the portion 16b the component 16 can then be easily placed in a resin transfer mould together with other materials/components which go to make the composite aerofoil, and the mould cavity is then injected and filled with resin, and cured. Resin flows into the interstices of the PEEK fabric and firmly bonds the leading edge fabric to the remaining layup of the composite aerofoil, with only a single bonding interface between the two.

As an alternative, the PEEK fabric sheet 10 could be laid up and co-cured with a further strengthening fabric, such as a glass-and/or carbon-fibre fabric, before being locally moulded between the tools 12 and 14 as described above.

Due to the small surface area of contact between the male and female moulding tools only a very small tool surface area needs be thermally controlled, and only a relatively small tool mass is required. The relatively small surface area needed for the process also allows for an easy increase in applied pressure if needed. Further, the female moulding tool 14 can have several recesses 14a so as to accommodate several male moulding tools, and therefore leading edge component samples, in a single heat/pressure cycle.

Whilst in the above-described embodiment the depth of the recess 14a is of the order of 3 mm, this could of course be varied to suit any particular profile being manufactured. In its most basic form the male tool need only be greater in depth than the recess 16a, even though a substantially larger male tool is depicted in FIGS. 2 and 4. The male, and/or female tools could be prismatic in profile.

The present invention provides a protective leading edge strip for an aerofoil, such as a blade or vane, which itself is easy to manufacture and which can also be readily introduced into a resin transfer mould.

The invention claimed is:

1. A method of forming a protective leading edge strip component for an aerofoil, comprising:
    locating a portion of a thermoplastics fabric sheet between complementary male and female moulding tools; and
    applying heat and pressure to the portion of fabric sheet to cause the portion of fabric sheet to take the shape of at least the tip of the male moulding tool to thereby form the protective leading edge strip component for the aerofoil, wherein
    the male moulding tool projects from a sidewall,
    the thermoplastics fabric sheet has a maximum thickness, and
    the female moulding tool includes a recess which is arranged in use to retain only the tip of the male moulding tool and the portion of fabric sheet therebetween, the recess of the female moulding tool being configured such that a gap greater than the maximum thickness of the thermoplastics fabric sheet is present between the female moulding tool and the sidewall having the male moulding tool at a location where the male moulding tool projects from the sidewall when the recess of the female moulding tool and the tip of the male moulding tool are brought into contact with each other.

2. The method according to claim 1, wherein at least the tip the male moulding tool has the shape of a leading edge of an aerofoil.

3. The method according to claim 1, wherein heat is applied to the portion of fabric by the female moulding tool.

4. The method according to claim 1, wherein the fabric comprises a polyaryi ether ether ketone woven fabric.

5. A method according to claim 1, wherein the thermoplastics sheet is part of a laminate with a strengthening fabric.

6. A method according to claim 5, wherein the strengthening fabric is a glass fibre fabric.

7. A method according to claim 5, wherein the strengthening fabric is a carbon fibre fabric.

8. A protective leading edge strip component for use with a male and a female moulding tool in manufacturing an aerofoil, the component comprising:

a flexible thermoplastic fabric sheet with a rigid first moulded portion having the form of a tip of the male moulding tool and a second unmoulded portion which is longer than the first moulded portion with respect to a maximum length of the thermoplastic fabric sheet, the first moulded portion and the second unmoulded portion having different rigidities, the first moulded portion having the shape of a leading edge of the aerofoil.

9. A method of forming a protective leading edge strip component for an aerofoil, comprising:

locating a portion of a drapable thermoplastics fabric sheet between complementary male and female moulding tools; and applying heat and pressure to the portion of fabric to cause the portion of fabric between the complementary male and female moulding tools to take the shape of the tip of the male moulding tool, wherein other than the portion of the fabric which has taken the shape of the tip of the male moulding tool, the drapable thermoplastic fabric remains as unmoulded drapable fabric, and at least the tip of the male moulding tool has the shape of a leading edge of the aerofoil.

10. The method according to claim 9, wherein heat is applied to the portion of fabric by the female moulding tool.

11. The method according to claim 9, wherein the fabric comprises a polyaryl ether ether ketone woven fabric.

12. The method according to claim 9, wherein
the leading edge strip component is subsequently placed into a resin transfer mould having a mould cavity that is subsequently filled with resin and cured.

13. The method according to claim 9, wherein a majority of the drapable thermoplastic fabric remains as unmoulded drapable fabric.

14. The method according to claim 9, wherein
after the applying of heat and pressure to the portion of fabric, the unmoulded drapable fabric is longer than the portion of fabric to which heat and pressure were applied, with respect to a maximum length of the thermoplastic fabric sheet.

* * * * *